United States Patent [19]

Brown

[11] 4,329,804
[45] May 18, 1982

[54] LURE WITH INTERLOCKING ATTACHMENT

[76] Inventor: Robert L. Brown, 2003 N. 48th Ave., Omaha, Nebr. 68104

[21] Appl. No.: 78,191

[22] Filed: Sep. 24, 1979

[51] Int. Cl.³ .............................................. A01K 85/00
[52] U.S. Cl. .................................. 43/42.09; 43/42.13; 43/42.28
[58] Field of Search ........ 43/42.09, 42.13, 42.24–42.3, 43/42.38, 42.41; 24/204; 2/DIG. 6

[56] References Cited

U.S. PATENT DOCUMENTS

| | | | |
|---|---|---|---|
| 1,776,090 | 9/1930 | Shroyer | 43/42.09 |
| 1,781,598 | 11/1930 | Peckinpaugh | 43/42.25 |
| 2,365,502 | 12/1944 | Weesner | 43/42.28 |
| 3,383,738 | 5/1968 | Fox et al. | 24/204 |
| 3,543,977 | 12/1970 | Lockridge | 24/204 |
| 3,828,463 | 8/1974 | Perrin | 43/42.28 |
| 3,855,722 | 12/1974 | Moore | 43/42.28 |
| 3,990,171 | 11/1976 | Davis | 43/42.28 |
| 4,074,454 | 2/1978 | Cordell | 43/42.28 |
| 4,079,767 | 3/1978 | Howard | 24/204 |
| 4,158,927 | 6/1979 | Capra et al. | 43/42.24 |

OTHER PUBLICATIONS

Velcro Advertisement, Washington Post and Times Herald, Washington, D.C., Mar. 6, 1959, Section D, p. 12.
"Skirt Boosts Lure's Allure", Popular Mechanics, Sep. 1960, p. 129.

Primary Examiner—Nicholas P. Godici
Assistant Examiner—K. Bradford Adolphson
Attorney, Agent, or Firm—Hiram A. Sturges

[57] ABSTRACT

A fishing lure comprising at least one fish hook having two retainers on its shank, a piece of flexible material wrapped around the shank between the retainers, the material having first protrusions on one side and second protrusions on the other side, the first and second protrusions being adapted to releasably interlock with each other, a skirt or other visible lure assembly attached to the strip and secured to the shank thereby.

7 Claims, 4 Drawing Figures

LURE WITH INTERLOCKING ATTACHMENT

BACKGROUND OF THE INVENTION

In the prior art skirts have been secured to fish hooks by various means, but it is an object of this invention to provide a way to secure a skirt or other lure assembly to a fish hook shank in a way that is quick to attach and, therefore, economical to attach as a matter of time cost, and in a way that is quickly removable for replacement.

The replacement of a lure element, such as a skirt, can be very important, because the replacement can be done with a lure element of different appearance or color which might be more attractive to fish on a particular day involved, or the particular kind of fish in those waters.

Experienced fishermen avoid the use of clasps for releasably connecting lures to a line, especially for some kinds of fishing. They prefer to tie the line directly to the eye of the hook. So to replace a lure involves either untying or cutting the line, and taking the time to tie a good knot around the eye of a different lure. However, with my invention it is possible to leave the hook attached directly to the line and yet change the appearance of the lure by removing a lure element attached by a strip of interlocking protrusion material and replacing it with another strip to which already was attached a different lure element or skirt of a different color.

A further advantage of this invention is that the attachment strip I propose to use has much more size to it than prior art attachment methods, and so it causes a skirt to bush out more, whereby it conceals the hook better from the fish, is more attractive, and protects the hook better from weeds.

I have discovered also that the bushing out of the skirt, because of my attachment strip, causes the skirt tails to stay untangled which is resultant from the way the more sizeable attachment strip of this invention tends to hold the skirt.

I have further discovered that the tails of the skirt wave better in the water, because they are more spread out with the use of my attachment strip.

SUMMARY OF THE INVENTION

The main objective of this invention is to provide a fishing lure comprising at least one fish hook having two retainers on its shank, a piece of flexible material wrapped around the shank between the retainers, the material having first protrusions on one side and second protrusions on the other side, the first and second protrusions being adapted to releasably interlock with each other, a skirt or other visible lure assembly attached to the strip and secured to the shank thereby.

Another objective is to provide a shank receiving portion attached to the hook shank and extending outwardly therefrom on all sides in a position inside of the attachment strip, so as to facilitate the wrapping of the strip around the shank.

DESCRIPTION OF THE PREFERRED EMBODIMENT

Figure 1:
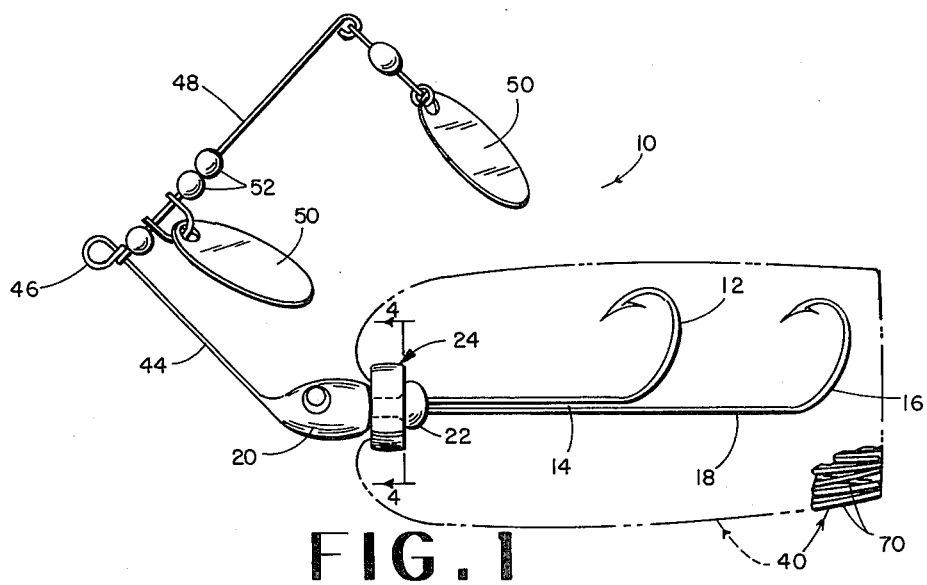
FIG. 1 is a side elevation of a lure shown in a use position, as though it were trailing through the water toward the left, the view is diagrammatic in that the skirt is not completely shown but a possible position thereof is shown in outline other, a few of the strands thereof being shown in full lines but partially.
Figure 2:
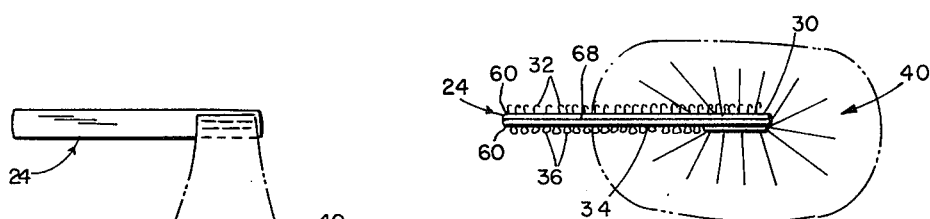
FIG. 2 is a top plan view of a piece of attachment strip of this invention shown with a skirt used to conceal the hooks attached thereto, the skirt being shown only in outline and diagrammatically.

A fishing lure with an interlocking attachment generally indicated at 10 is shown to have a first hook 12 with a first shank 14, a second hook 16 with a second shank 18.

A forward retainer 20 and a rearward retainer 22 are used to hold a strip 24 in place between the two retainers and around the shanks 14 and 18.

Figure 3:
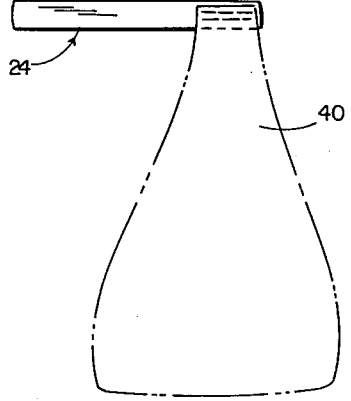
FIG. 3 is a view of the attachment strip and skirt as they would be seen from the top in FIG. 2, the skirt being shown diagrammatically only with its various skirt tails attached to a single piece of material, which latter is in turn attached to the attachment strip of this invention. Only a few of the skirt tails are shown for illustration and the outline thereof in the shape they might assume while in the water is shown in dotted lines.

The strip 24, as seen in FIG. 3, has an outer side 30 provided with hooking elements 32 and an inner side 34 provided with hook retaining elements 36. When the strip is wrapped around the shanks 14 and 18, as seen in FIG. 4, the hooking elements 32 hold the outer side 30 adjacent to the inner side 34 by interlocking with the hook retaining elements or protrusions 36.

The strip 24 is used to hold a lure element 40 onto the lure. The lure element 40 is constructed of a plurality of flexible strands which conceal the first and second hooks 12 and 16, and attract fish. The strands of the lure element 40 are disposed so as to extend alongside the hooks 12 and 16 at times when the lure 10 is moving forwardly. This assists in protecting the hooks 12 and 16 from weeds, and also in concealing the hooks from fish. The lure element 40 is held onto the lure 10 by means of the strip 24, which is easily removed. This allows a number of different lure element strands to be used, which is useful when fishing for various types of fish.

The strip 24 is constructed of a material which is sufficiently stiff to retain itself on the shanks 14 and 18 during normal fishing. It is also sufficiently flexible to enable the fisherman to easily unwind the strip when wishing to replace the lure element.

Figure 4:
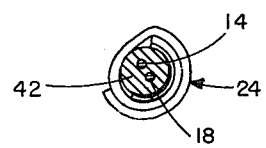
FIG. 4 is a sectional view taken along the line 4—4 of FIG. 1, but showing only the attachment strip and those parts of the lure which are inside of the attachment strip.

In FIG. 4, a shank enlarging portion 42 is shown to be surrounding the hook shanks 14 and 18. The shank enlarging portion 42 is useful in maintaining the shanks 14 and 18 in position, and also provides a larger circumference around which to wrap the strip 24. This feature makes it much easier for the fisherman to wrap and unwrap the strip from the lure.

In FIG. 1, an elongated lure extension 44 is attached at one end to the forward retainer 20, and at its opposite end to a fishing line eye 46. A reflector extension 48 extends at approximately a right angle from the lure extension 44 from a point on the lure extension which is close to the fishing line eye 46. The lure extension 44, the fishing line eye 46, and the reflector extension 48 are all shown to be constructed of one piece of material.

Reflectors 50 are shown to be attached to the reflector extension 48. Colored spheres 52 are also shown as being connected to the reflector extension 48.

The strip 24 can be formed of two backing pieces 60 to one of which the first hooking elements or protrusions 32 are attached and to the other of which the second protrusions or loops 36 are attached.

Any suitable means such as stitching or bonding material at 68 attaches the backing pieces 60 together to form the strip 24.

The lure element 40 can be a skirt having a plurality of skirt strings or strands 70 which extend over the hooks 12 and 18, waving in the water and partially concealing the hooks.

I claim:

1. A lure comprising at least one fish hook having an elongated shank extending forwardly from an arcuate portion, forward and rearward spaced retainers of larger size as measured transversely of said shank than said shank, a strip of flexible material having first protrusions on one side and second protrusions on its opposite side, said first and second protrusions are specifically tiny hooks and material in which said hooks can catch when said hooks are pressed into engagement with said material, said strip being wrapped around said shank between said retainers, said strip being sufficiently long as to extend around said shank enough for outer portions of said strip to overlap inner portions of said strip so as to cause sufficient interlocking of said first and second protrusions as to hold said strip on said shank, said retainers retaining said strip from excessive movement along said shank while said strip and protrusions are in said wrapped and interlocked positions respectively, a visible lure element useful in assisting the catching of fish attached to said strip and secured to said hook by said strip.

2. The lure of claim 1 in which said visible lure element comprises strands of flexible material adapted to conceal portions of said hook.

3. The lure of claim 2 in which said strands extend alongside said hook during forward motion of said lure and assist in protecting said hook from weeds and in concealing said hook from fish.

4. The lure of claim 1 in which said first and second protrusions are sufficiently stiff to serve to retain said strip on said shank during normal fishing and also sufficiently flexible that a fisherman can unwind said strip from said hook for the placement of a different strip on said hook to which latter is attached a visible lure element of a different appearance for providing variety in the lure achievable on the same hook without detachment of the hook from a fishing line.

5. The lure of claim 1 in which said strip comprises first and second strip sections, said first strip section having an outer side with said first protrusions extending therefrom, said second strip section having an outer side with said second protrusions extending therefrom, means securing said first and second strip sections together with their inner sides against each other so that said strip sections form a single strip unit.

6. The lure of claim 1 having a second fish hook provided with an arcuate portion disposed rearwardly of said first fish hook, said second fish hook having an elongated shank disposed alongside the elongated shank of said first fish hook, said forward and rearward retainers extending around both of said shanks.

7. The lure of claim 1 having a shank enlarging portion disposed beneath said strip and attached to said shank between said retainers and extending outwardly from said shank on all sides of said shank, said shank enlarging portion having a substantially greater outer circumference than said shank so as to facilitate the wrapping of said strip by providing a surface to wrap said strip on which is of larger circumference than said strip.

* * * * *